United States Patent [19]

Gerber et al.

[11] Patent Number: 5,163,008
[45] Date of Patent: Nov. 10, 1992

[54] METHOD AND APPARATUS FOR ADVANCING SHEET MATERIAL FOR THE CUTTING OF SUCCESSIVE SEGMENTS THEREOF

[75] Inventors: H. Joseph Gerber, West Hartford; Zdenek Zeman, Willington, both of Conn.

[73] Assignee: Gerber Garment Technology, Inc., Tolland, Conn.

[21] Appl. No.: 571,074

[22] Filed: Aug. 21, 1990

[51] Int. Cl.$^5$ .................. G05B 15/02; B26D 5/06
[52] U.S. Cl. .................. 364/474.09; 364/470; 83/35; 226/27
[58] Field of Search .......... 364/474.09, 470, 167.01; 83/29, 33, 34, 35; 226/24, 27

[56] References Cited

U.S. PATENT DOCUMENTS

| | | | |
|---|---|---|---|
| 3,761,675 | 9/1973 | Mason et al. | 219/121 LM |
| 3,769,488 | 10/1973 | Hasslinger | 219/121 L |
| 4,091,980 | 5/1978 | Gerber | 226/162 |
| 4,140,037 | 2/1979 | Gerber | 83/56 |
| 4,328,726 | 5/1982 | Pearl | 83/39 |
| 4,415,978 | 11/1983 | Craemer et al. | 364/474.09 |
| 4,483,472 | 11/1984 | Gerber | 226/16 |
| 4,740,668 | 4/1988 | Perez | 219/121 PC |
| 4,972,745 | 11/1990 | Bruder et al. | 83/422 |
| 5,042,338 | 8/1991 | Gerber | 83/34 |

FOREIGN PATENT DOCUMENTS

0315202 5/1989 European Pat. Off.
2478340 9/1981 France.

*Primary Examiner*—Jerry Smith
*Assistant Examiner*—Paul Gordon
*Attorney, Agent, or Firm*—McCormick, Paulding & Huber

[57] ABSTRACT

In a method and apparatus for cutting either a single sheet or a lay-up of sheets of material to derive pattern pieces or the like from the material, the material is cut segment-by-segment by bringing a fresh segment to a cutting station after a preceding segment has been entirely cut. Discontinuities, which may translate into points of non-clean cutting, which might otherwise occur in cut lines as they pass to one segment to another, because of accidental shifting or mispositioning of the material during advancement, are avoided or reduced by acquiring the start and finish X and Y coordinates of an index point on the material and then using such coordinates with the cutting instructions used in the cutting of the subsequent segment, the use of the coordinates being such that accidental shifting or mispositioning of the material is taken into account and compensated for in the cutting of the second segment.

31 Claims, 5 Drawing Sheets

METHOD AND APPARATUS FOR ADVANCING SHEET MATERIAL FOR THE CUTTING OF SUCCESSIVE SEGMENTS THEREOF

FIELD OF THE INVENTION

This invention relates to a method and apparatus for cutting sheet material, such as fabrics for making clothing, upholstery or the like, spread either as a single sheet or a lay-up of sheets on a supporting surface, and deals more particularly with improvements in such method and apparatus for promoting the regular cutting and complete severing or separation of a cut pattern piece from the adjacent waste material despite the withdrawal of the cutting tool from the work material during its progress along a line defining the periphery of the pattern piece, the advancement of the work material during such withdrawal to bring a fresh segment of the material to the cutting station, and the resumption of the cutting along the peripheral line after such advancement.

BACKGROUND OF THE INVENTION

The method and apparatus of this invention are ones relating to the cutting of pattern pieces from sheet material by means of a cutting tool moved along lines of cut defining the pattern pieces and wherein as the cutting tool is moved along such a line of cut the cutting of the involved pattern piece is interrupted, the cutting tool is removed from cutting engagement with the material, and the material is advanced to bring a fresh segment of it to the cutting station before the cutting of the involved pattern piece is resumed.

After pattern pieces are cut from sheet material they are removed either by hand or by machine from the adjacent waste material. To allow an efficient separation it is quite important that the pattern pieces be cleanly cut from the waste material and that no uncut strings, threads or connecting bridges exist between the pieces and the waste material. If such uncut features exist the pattern pieces may fail to be removed or expensive time consuming additional manual steps may have to be performed to complete the separation. Further, the cut pattern pieces may have an irregular shape. One way to eliminate, or at least reduce, these problems is to cut each pattern piece with a single complete movement of the cutting tool along the periphery of each pattern piece without removing it from start to finish from cutting engagement with the material. Such "all-at-once" cutting of a pattern piece is not, however, always practical or possible and it may in many instances be desirable or necessary to interrupt the cutting of a pattern piece periphery with the cutting tool being withdrawn from cutting engagement with the material during such interruption. Unfortunately, the points at which these interruptions occur tend to be points at which irregularities or incomplete cutting of the pattern pieces from the waste material may occur.

Until recently, conveyorized cutting machines have been designed with cutting station lengths long enough to make it practical, if desired, to cut most or all of the wanted pattern pieces so that each is cut in a single continuous cycle of the cutting tool around its periphery. Typically, the cutting stations of these machines have been 13 to 20 feet or more in length. Since the cost of such a machine is directly proportional to its cutting station length a machine with a shorter cutting station can offer advantages of lower cost and of requiring less floor space. A shortened cutting station, however, may make it difficult or impossible to design cutting markers permitting each pattern piece to be cut all at once without shifting the material relative to the cutting station. That is, as the cutting station length is shortened it becomes more necessary to cut some pattern pieces in two or more stages with the work material being advanced between each stage. The points at which the periphery of such a pattern piece intersects the dividing line between adjacent segments of the material are points at which clean cutting problems are likely to occur due to shifting or mispositioning of the material taking place at such a point between the time of first cutting at that point and the time of later cutting at the same point.

When automatically cutting pattern pieces from a length of work material in accordance with a marker, marker information is supplied to the controller of the cutting machine in the form of data describing the peripheries of pattern pieces in terms of points identified by X and Y coordinates referenced to a set of X and Y marker coordinate axes. This marker data is then converted to machine commands, for controlling movement of the cutting tool in X and Y coordinate directions, defining the desired paths of movement of the cutting tool by points described by X and Y coordinates referenced to X and Y coordinate axes fixed relative to the machine frame. When the work material is initially placed on the supporting surface of the machine it takes a given positional relationship with respect to the machine coordinate axes. This initial positional relationship between the work material and the machine coordinate axes may, depending on circumstances, be established somewhat casually or with different degrees of care; however, for accurate cutting of the entire marker it has been necessary in the past that the positional relationship between the work material and the machine coordinate axes be maintained from start to finish in the cutting of the marker.

When cutting sheet material on a long non-conveyorized cutting machine few problems arise in keeping the work material fixed relative to the machine coordinate axes during the cutting of an entire marker. However, in conveyorized cutting machines problems do arise in that the material may shift relative to the machine coordinate axes during the segment-by-segment advances of the material to the cutting station, or in that the advancements themselves may be inaccurately carried out. In the cutting of the second and successive segments the material therefore may not be positioned where expected with regard to the machine coordinate axes, the cutting tool as a consequence following actual paths of movement on the work material displaced from the expected lines of cut. This displacement of the actual cut from the expected cut is particularly troublesome in cases where a pattern piece extends from one segment to another and may cause such a pattern piece to be of irregular shape or to be incompletely separated from the waste material in the vicinity of the points at which its periphery intersects the dividing line between the two segments.

The general object of the invention is therefore to provide a method and apparatus used in the automatic cutting of sheet material to overcome or reduce cutting problems arising from accidental shifting, flexural displacement or mispositioning of the work material relative to the coordinate axes of a cutting machine during advancement of the work material relative to the cutting station to bring a fresh segment of the material to the cutting station.

A more specific object of the invention is to provide a method and apparatus for promoting the regular and clean cutting of pattern pieces from work material in the segment-by-segment cutting of the work material in instances where pattern pieces extend from one segment to another.

Other objects and advantages of the invention will be apparent from the following detailed description of preferred embodiments of the invention and from the accompanying drawings and claims.

SUMMARY OF THE INVENTION

The invention resides in a method and apparatus for the segment-by-segment cutting of a length of work material to cut pattern piece peripheries or other lines in such work material and for promoting the likelihood that a line which in the marker representation passes from one material segment to another without discontinuity will when actually cut in the work material likewise pass from one segment to another without discontinuity despite possible accidental shifting, flexural displacement or mispositioning of the work material occurring during the material's advancement relative to the cutting station.

More particularly the invention resides in a method and apparatus wherein a set of marker data is provided and used to yield a set of cutting instructions which is used to cut a first segment of the work material, an index point is designated on the work material, the material is advanced to bring a second segment to the cutting station, the X and Y coordinates of the index point are determined at the start and finish of the advancement step relative to the X and Y machine axes, and these start and finish coordinates of the index point are then used with the cutting instructions to control movement of the cutting tool to cut lines in the segment of the work material. The determination of the start and finish X and Y coordinates of the index point and the use of these coordinates with the cutting instructions to control the cutting tool during the cutting of the second segment is such that any unexpected shifting or mispositioning of the work material taking place during the advancement is accounted for to cause lines of cut to smoothly transition from one segment to another when such smooth transitioning is called for by the marker data.

Still more particularly the invention resides in a method and apparatus wherein a set of marker data is provided and used to yield a set of cutting instructions in which points defining lines to be cut are identified by coordinates referenced to a set of X and Y machine coordinate axes fixed relative to the machine frame. The cutting tool is moved in response to the cutting instructions by means of a feedback control system including for each axis of movement an encoder having an output representing the instantaneous position of the cutting tool in the associated coordinate axis. A first segment of the work material is moved to the cutting station and the cutting instructions are used to cut the material using the feedback control system so that when the cutting tool is instructed to move to a new point it is moved toward that point until the outputs of the two encoders agree with the two instructed coordinates of the new point. While the first segment is still at the cutting station an index point on the material is identified and its coordinates relative to the machine axes are determined by registering a registration point fixed to the cutter head with the index point and interrogating the encoders. The material is then advanced to bring the next or second segment to the cutting station. The registration point fixed to the cutter head is then again registered with the index point. The encoder outputs which then appear are then used with the encoder outputs obtained when the registration point was aligned with the index point before the material advancement to provide a correction factor for each coordinate axis, and these correction factors are then used in combination with the cutting instructions to cut the second segment. This acquisition of a correction factor for each coordinate axis by using the encoders to determine the coordinates of an index point on the material both before and after the material's advancement and the use of these correction factors in the cutting of the second segment, is such that any unexpected shifting or mispositioning of the work material taking place during the advancement is detected and accounted for to cause lines of cut to smoothly transition from one segment to another when such smooth transitioning is called for by the marker data.

The invention also includes the possibility of using the method and apparatus described above in connection with only one or the other of the two coordinate axes. That is, the method and apparatus may be used to compensate for positioning errors occurring in one coordinate axis with no such compensation being made for positioning errors in the other coordinate axis.

The invention also resides in other features of the method and apparatus defined by the appended claims.

DESCRIPTION OF THE PREFERRED EMBODIMENTS

The method and apparatus of this invention are useful in the cutting of sheet material and are applicable to various different kinds of cutting tools and cutting machines. For example, the cutting tool used for performing the actual cutting operation may be a reciprocating knife, an ultrasonically vibrated knife, a rotatable knife, a laser beam or a water jet. The cutting machine of which the cutting tool is a part may also, for example, be one wherein the cutting tool is moved either semi-automatically of automatically along lines of cut by a computer implemented control system using instructions derived from a set of marker data describing in X and Y coordinates the shape and arrangement of pattern pieces wanted from the sheet material.

Figure 1:
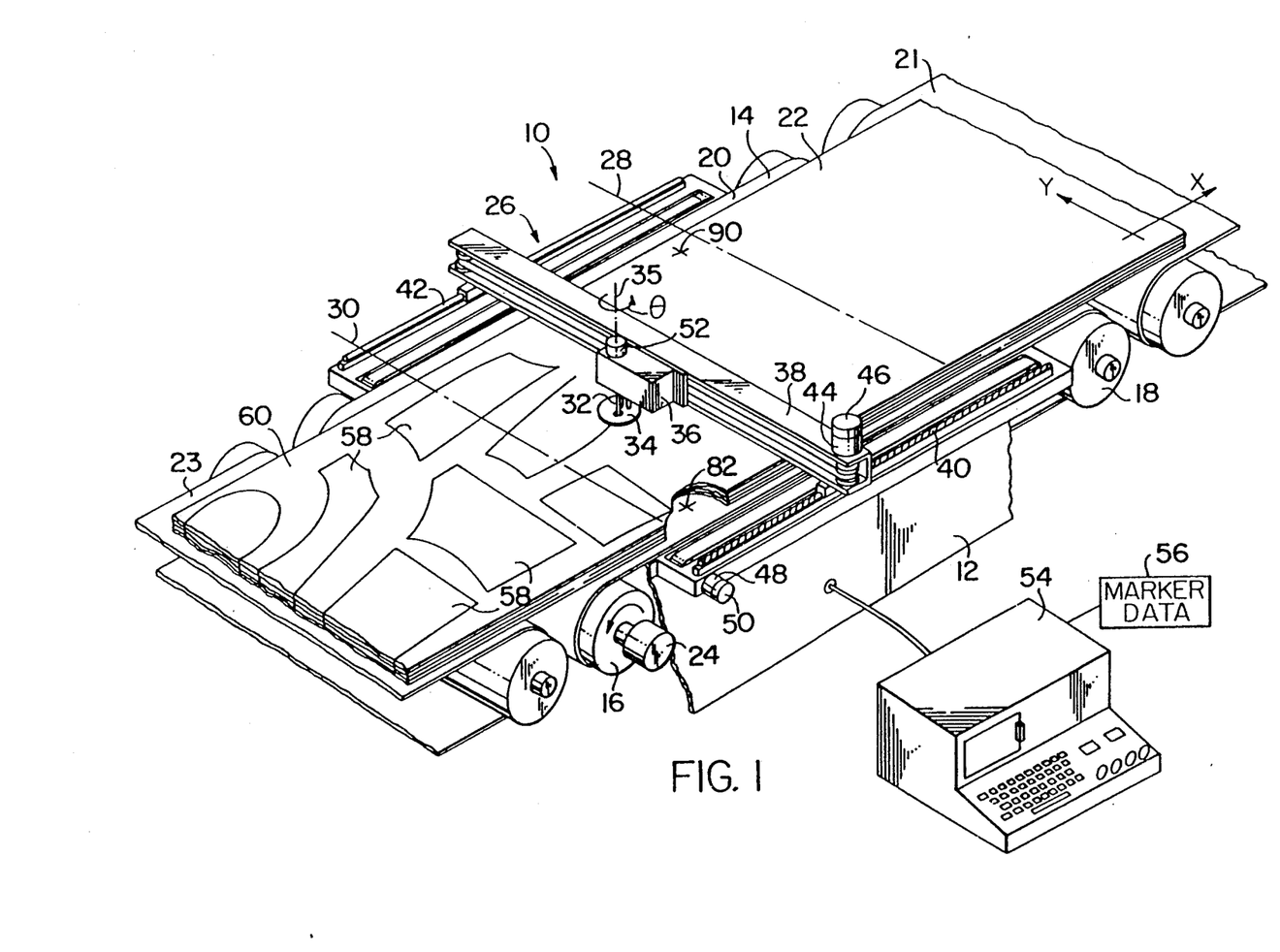
FIG. 1 is a perspective, somewhat schematic view of a cutting machine embodying the present invention.

Referring to FIG. 1, the invention is shown and described herein as embodied in an automatically controlled cutting machine 10 having a cutting station 26 of shorter length than the material to be cut and having a conveyor for supporting the work material at the cutting station and for moving it lengthwise relative to the frame of the machine to bring successive segments of the material to the cutting station. This machine 10 includes a stationary frame 12 and an endless belt-like conveyor member 14 trained about rolls 16 and 18. The conveyor member 14 may for example be of the type shown in U.S. Pat. No. 4,328,723 wherein the member is part of a cutting machine using vacuum to compress and hold the work material to the support surface and is made up of a large number of transversely extending bristle block carrying grids or slats pivotally connected to one another and wherein the rolls 16 and 18 are of suitable sprocket-like shape for positive driving cooperation with the conveyor member. In any event, the conveyor member 14 provides, along its upper run, an upwardly facing supporting surface 20 for supporting work material 22 shown as a lay-up of a number of superimposed sheets of sheet material. The forward roll 16 is powered by a drive motor 24 which rotates the roll in the counter-clockwise direction illustrated by the arrow to move the work material 22 along the illustrated X coordinate axis toward the left as viewed in FIG. 1.

Various different means may be used with the machine 10 for assisting in bringing work material to and taking it from the cutting station 26. In the illustrated case of FIG. 1 these means include a feed conveyor 21 and a take-away conveyor 23 which may be of types well known in the art and which may be driven in unison with the conveyor member 14. In the alternative, the illustrated conveyor member 14 may be lengthened at either or both ends of the machine 10 to take the place of the separate feed conveyor 21 and/or the take-away conveyor 23.

The cutting station 26 has an effective range in the X coordinate direction defined by the limit lines 28 and 30, and has a range in the Y coordinate direction approximately equal to the width of the conveyor member 14. At the cutting station is a cutting tool 32 moveable in the X and Y coordinate directions over the full area of the cutting station to cut lines in the segment of work material positioned at the cutting station.

In the illustrated case the cutting tool 32 is a reciprocating knife cooperating with a presser foot 34 and reciprocated along a cutting axis 35 extending generally perpendicularly to the plane of the supporting surface 20. The cutting tool and the presser foot are carried by a cutter head 36, in turn carried by a main carriage 38, for movement relative thereto in the illustrated Y coordinate direction. The main carriage straddles the conveyor member 14 and at each of its opposite ends is supported by suitable longitudinally extending guides 40, 42 for movement in the X coordinate direction relative to the frame 12. A Y drive means including a motor 44 and a Y encoder 46 (FIG. 2) drives the cutter head 36 in the Y coordinate direction relative to the main carriage 38; and an X drive means including a motor 48 and an X encoder 50 (FIG. 2) drives the main carriage 38 in the X coordinate direction.

Figure 2:
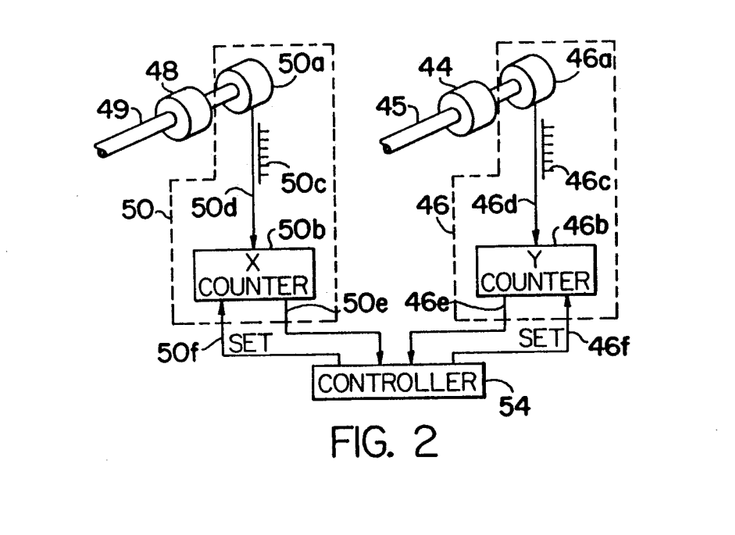
FIG. 2 is a schematic block diagram explaining the construction and operation of the encoders of the machine of FIG. 1.

Each of the encoders 46 and 50 is of a type which produces an output signal representing the instantaneous or actual position in the related coordinate axis of the cutting tool or some other point fixed relative to the cutter head 36, and which can be set to any desired starting value by the controller 54. Referring to FIG. 2, in the illustrated case the X encoder 46 comprises a rotational displacement sensor 46a fixed to the output shaft 45 of the Y motor 44. In response to rotation of the shaft 45 the sensor 46a produces output pulses 46c on a line 46d with the appearance of each pulse indicating a fixed increment of displacement of the cutter head in the Y coordinate direction. These pulses 46c are supplied to a Y counter 46b which is either counted up or counted down by the pulses 46c depending on the direction of rotation of the shaft 45. Accordingly, if when a registration point fixed to the cutter head is aligned with a reference point fixed to the machine frame the counter 46b is set to a starting value, at a later time the difference between the then present count of the counter and the starting count of the counter will directly represent the then present displacement of the registration point in the Y coordinate direction from the reference point. A starting count is set into the counter 46d by the controller 54 over the line 46f. The X encoder 50 is similar to the Y encoder 46 except that the rotational displacement sensor 50a is attached to the output shaft 49 of the X axis drive motor 48 thereby causing the X counter 50b to have an output signal on the line 50e representing the instantaneous position of a registraton point fixed relative to the cutter head in the X coordinate axis. In FIG. 2 the Y counter 46b and the X counter 50b are for convenience shown separate from the controller 54, but, as is typically the case, these counters may in actuality be part of the controller 54.

Figure 3:
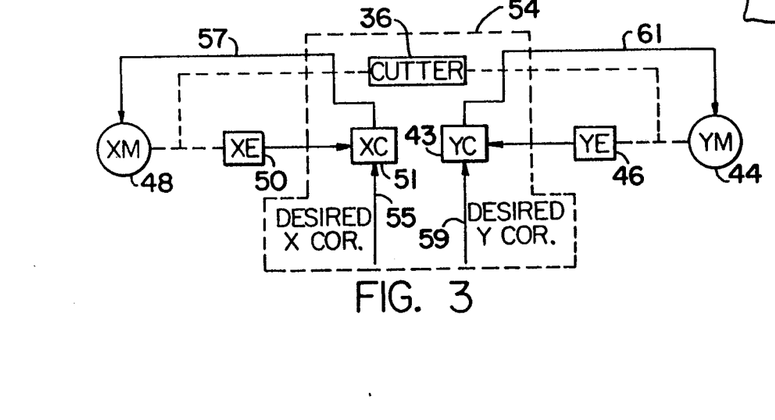
FIG. 3 is a schematic block diagram showing the feedback control circuit associated with each of the X and Y drive motors of the machine of FIG. 1.

The cutter head 36 in each coordinate axis is driven by a feedback control or positioning circuit using the drive motor and encoder assigned to that axis. This system is shown in FIG. 3. Referring to this figure the feedback circuit for the X axis in addition to the X drive motor 48 and the X encoder 50 includes an X comparator 51. Likewise the feedback control system for the Y axis in addition to the Y drive motor 44 and the Y encoder 46 includes a Y comparator 43. Preferably the comparator functions are provided by the digital controller 54. In the operation of the system when the cutter head 36 is to be driven to a new point the controller 54, of which the comparators 51 and 43 are a part, provides the desired X and Y coordinates of the new point. The desired X coordinate appears on a line 55 and is supplied to the X comparator 51. The comparator compares this desired X coordinate with the actual X coordinate of the cutter head 36 supplied by the X encoder 50. If the desired and actual X coordinates do not agree the comparator provides an error signal transmitted to the X motor 48 over the line 57 causing the X motor 48 to be operated to drive the cutter head 36 in the X coordinate direction toward the desired X coordinate position dictated by the signal appearing on the line 55. Similarly the desired Y coordinate appears on the line 59 and is supplied to the Y comparator 43. This comparator compares the desired X coordinate with the actual Y coordinate of the cutter head 36 as supplied by the encoder 46, and if these two coordinate values do not agree an error signal is produced on the line 61 actuating the Y motor 44 to drive the cutter 36 in the Y coordinate direction toward the desired Y coordinate.

A reciprocating motor (not shown) in the cutter head drives the cutting tool 32 in its reciprocating motion, and another motor (not shown) rotates the cutting tool, under control of the controller 54, in the $\theta$ direction about the axis 35 to keep the tool facing forwardly along the line of cut. A solenoid 52 carried by the cutter head 36 is operable to move the cutter head frame, and therewith the cutting tool 32 and the presser foot 34, between a lowered position at which the cutting tool is in cutting engagement with the material 22 and a raised position at which the tool is out of cutting engagement with the material 22.

The computer implemented controller 54 supplies the necessary commands, as described above, to the machine to operate the X and Y motors 48 and 44, the solenoid 52 and other parts of the machine so that the tool 32 is moved along desired lines of cut relative to the work material positioned at the cutting station 26. The desired lines of cut and other information are provided by marker data, indicated representationally at 56, which is processed by the controller 54 to yield the actual cutting instructions, such as the coordinates of the successive points to which the cutter head is to be moved, used to operate the machine 10. A method and system for producing such marker data is, for example, described in U.S Pat. No. 3,887,903. The data may be supplied either on line directly to a memory in the controller 54 or may be supplied to the controller prerecorded on a tape, disc or other memory medium.

In the operation of the machine 10, after a segment of the work material is positioned at the work station 26 the cutting tool is moved in the X and Y coordinate directions to cut lines in such segment, such lines usually being the peripheries of desired pattern pieces 58. After the segment is fully cut the cutting operation is interrupted, the drive motor 24 is operated to bring the next succeeding segment of work material to the work station and then the cutting tool 32 is operated again to cut lines in the fresh segment. Such segment-by-segment cutting is continued until all of the desired pattern pieces have been cut.

As explained previously, following the cutting of pattern pieces by the cutting tool 32 the pattern pieces are removed from the adjacent waste material 60 either by picking up the cut pattern pieces by hand or by using a mechanical separating means. To facilitate this separation it is essential that the pattern pieces be cleanly cut and separated from the waste material with there being no uncut fibers, strings or bridges connecting the pattern pieces to the waste material.

A situation in which non-clean or irregular cutting tends to occur is when in segment-by-segment cutting of the work material a pattern piece to be cut from the work material has one part falling in one segment and another part falling in a following segment. Such a situation is shown, for example, in FIG. 4. In that figure, the illustrated pattern piece 58 has one part located in a first segment 74 of the work material 22 and another part located in the following or second segment 76 of the work material. In conventional cutting of the illustrated pattern piece the part located in the segment 74 is cut while that segment is located at the cutting station 26 with the tool being inserted into the material at point A and moved in cutting engagement with the material to the point B in the clockwise direction indicated generally by the arrow 79. At the point B the tool is removed from cutting engagement with the material and may be used, if necessary, to cut other lines appearing in the segment 74 while that segment is still at the cutting station 26. When all of the lines in the first segment 74 have been cut the material is advanced in the X coordinate direction, toward the left as indicated by the arrow M, relative to the machine frame, by operation of the conveyor element 14, to bring the second segment 76 to the cutting station. At some time while the second segment 76 is at the cutting station the cutting of the illustrated pattern piece 58 is completed by re-engaging the cutting tool with the material at the point B and cutting along the remainder of its peripheral line 62 by moving the tool from the point B to the point A along the path indicated generally by the arrow 81.

Figure 4:
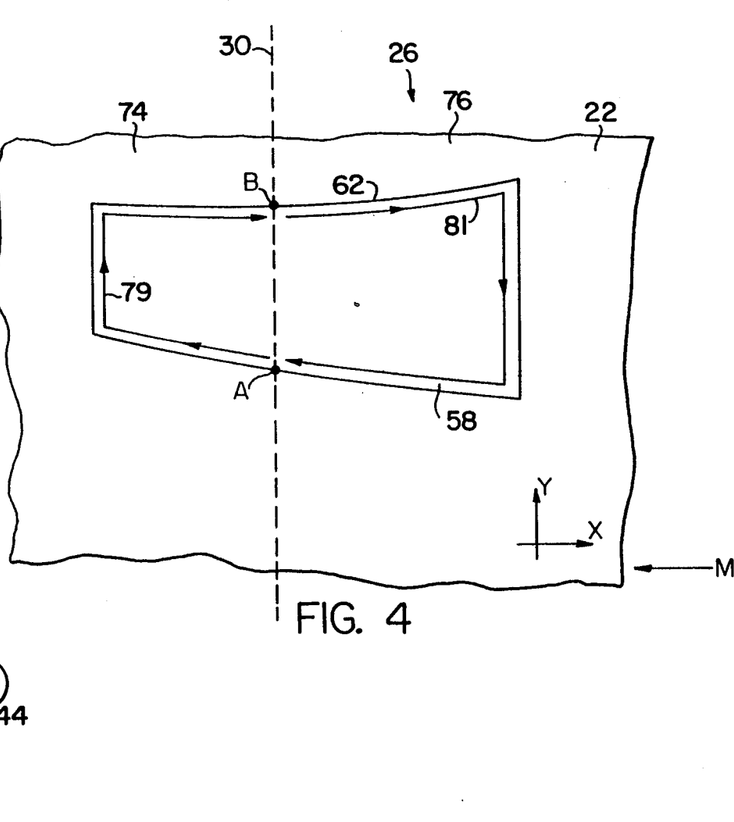
FIG. 4 is a fragmentary plan view showing the cutting of a pattern piece from work material by the machine of FIG. 1.

Because of accidental distortion of the work material relative to the machine frame during its advancement to bring the second segment to the work station, to errors in the positioning of the work material in the X and Y coordinate directions by the conveyor element 14, or to shifting of the conveyor itself relative to the machine frame, the beginning and ending points of the part of the pattern piece 58 cut in the segment 74 may not accurately register with the beginning and ending points of the part of the same pattern piece cut by the cutting tool in the segment 76. To overcome or minimize this problem, and in accordance with the invention, when the work material 22 is moved relative to the machine frame to bring a fresh segment of it to the cutting station, positioning errors which occur are detected and used with the cutting instructions for the fresh segment to maintain good registration between the beginning and ending points of the part of a pattern piece cut in the preceding segment and the beginning and ending points of the part of that pattern piece cut in the fresh segment.

Figure 5:
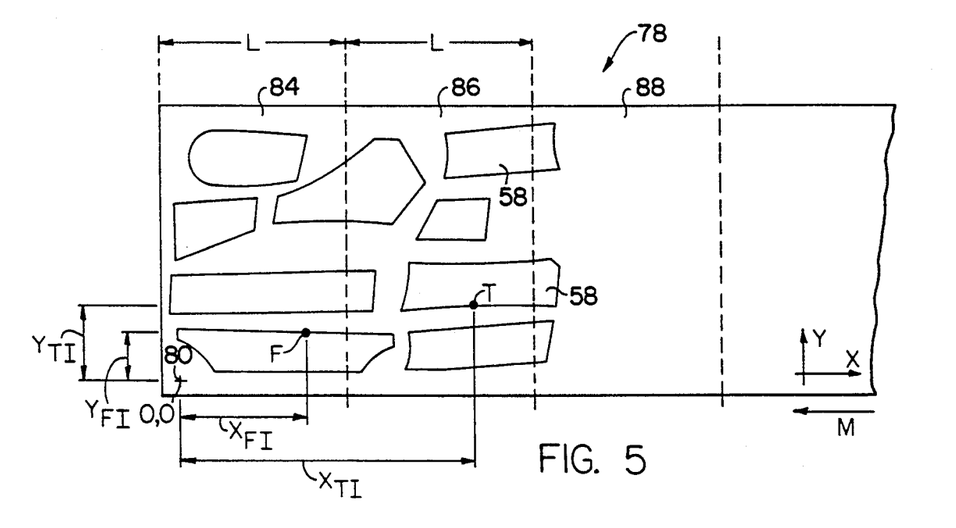
FIG. 5 is a plan view illustrating pattern pieces defined by the marker data used in conjunction with the machine of FIG. 1.

Referring to FIG. 5 this figure shows a drawing 78 illustrating the shape and arrangement of the pattern pieces 58 represented by the cutting instructions as would, in accordance with prior practice, be derived from the marker data and supplied to the cutting machine 10. That is, each point in these instructions, such as the point F, is represented by a pair of X and Y coordinates measured from an origin reference point 80 parallel to X and Y coordinate axes fixed relative to the drawing. In conventional practice, the reference point 80 is registered with (or referenced by known offsets to) a corresponding reference point 82 (FIG. 1) defining the origin of X and Y machine axes fixed relative to the machine frame 12.

In FIG. 5 successive segments of the drawing are indicated at 84, 86 and 88. In accordance with the invention, when the first segment of the work material, corresponding to segment 84 of the drawing 78 is brought to the cutting station the cutting instructions represented by the drawing 78 are used directly to control the cutting tool to cut the desired lines in the first segment of the work material. The material is then advanced along the X coordinate axis, as indicated by the arrow M, to bring the next segment of the material, corresponding to the segment 86 of the drawing 78, to the work station. Following this advance, it is to be expected that a point T in the drawing segment 86 will have machine axis coordinates of $$X_{TM} = X_{TI} - L, Y_{TM} = Y_{TI}$$

where, $X_{TI}$ = X coordinate of point T in instruction drawing coordinates
$X_{TM}$ = X coordinate of point T in machine coordinates
$Y_{TI}$ = Y coordinate of point T in instruction drawing coordinates
$Y_{TM}$ = Y coordinate of point T in machine coordinates
L = Length of segment in direction of material advance.

However, due to positioning errors in the X advancement and/or unintended shifting or distortion of the material during the advancement, the actual machine coordinates of the point on the material which is to correspond to point T of the drawing 78 will be:

$$X_{TM} = X_{TI} - L \pm \Delta X, Y_{TM} = Y_{TI} \pm \Delta Y$$

where, $\Delta X$ = position error in X coordinate direction, and
$\Delta Y$ = position error in Y coordinate direction.

To account for these errors the invention provides that while the first segment of material 22 is still at the cutting station 26, an index point, such as indicated at 90 in FIG. 1, is designated on the work material 22 near the right-hand end of the range of the cutting station. The X and Y coordinates of this point at both the start and the finish of the material advancement are then determined in the machine axes. In each axis the difference between the start and finish coordinates of the index point will include the errors mentioned above. That is:

$$X_S - X_F = L \pm \Delta X, \text{ and}$$
$$Y_S - X_F = \pm \Delta Y,$$

where, $X_S$ = X coordinate of index point at start of advancement
$X_F$ = X coordinate of index point at finish of advancement
$Y_S$ = Y coordinate of index point at start of advancement
$Y_F$ = Y coordinate of index point at finish of advancement Therefore, the starting and finish coordinates of the index point can be used to derive a correction factor for each axis which can be used with the cutting instructions for the cutting of the second segment so as to cause lines of cut which pass from one segment to another to make the transition smoothly if so called for by the marker data.

The determination of the coordinates of the index point at the start and finish of an advancement may be carried out in various different ways. Preferably, however, it is done using the encoders 46 and 50 and be aligning a registration point fixed relative to the cutter head 36 with the index point both before and after the material advancement and with the encoders being interrogated during each of said alignments to provide the desired index point coordinate information.

The alignment of the registration point with the index point can also be carried out in various different ways. One way of doing this is to associate a point following device with the cutter head 36 of FIG. 1. Just before the start of an advancement of the material a registration point provided by the point following device is registered with the index point 90 (FIG. 1). Then, when the material is moved in the X coordinate direction the point following device is operated to cause the cutter head 36 and cutting tool 32 to follow the index point. Therefore, throughout the advancement the registration point remains registered with the index point and the encoders may be interrogated both at the beginning and the end of the advancement to provide the desired index point coordinate information.

Of course, with regard to the situation described in the preceding paragraph instead of the cutter head motion being slaved to the motion of the material through the point follower, in the X coordinate direction the movement of the material may instead be slaved to the X movement of the cutter head. That is, to achieve the advancement of the material in the X coordinate direction the controller may energize the X motor 48 to move the cutter head in the X coordinate direction and then the point follower can be used to energize the conveyor drive motor 24 to cause the material to follow, in the X coordinate direction, the movement of the cutting tool.

Figure 6:
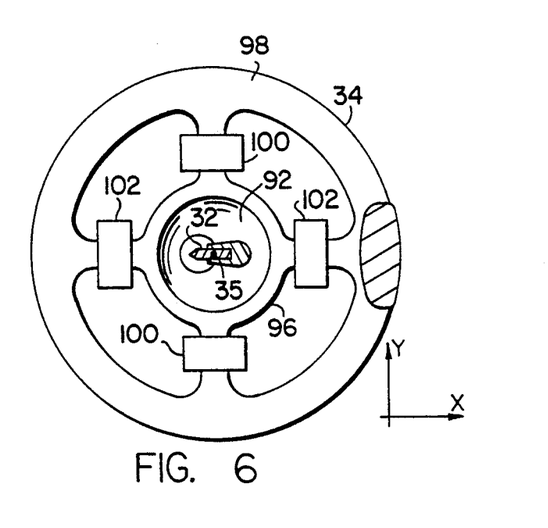
FIG. 6 is a plan view of the pressor foot of the machine of FIG. 1 and which forms part of a point following device.

Various different point following devices may be used, and by way of example one is illustrated in FIG. 6 which includes a means carried by the presser foot 34 for measuring forces exerted on the cutting tool 32 in the X and Y coordinate directions. The tool 32 is a knife guided in a generally circular member 92 supported for rotation about the axis of rotation 35 of the knife relative to an inner member 96 of the presser foot. Between the inner member 96 and the outer member 98 of the presser foot are two parts of a force sensor 100 for measuring the lateral force exerted on the knife 32 and two parts of a force sensor 102 for sensing the fore and aft force imposed on the knife. The knife can be rotated so the sensors 100 and 102 provide the forces in the X and Y coordinate directions, respectively.

Figure 7:
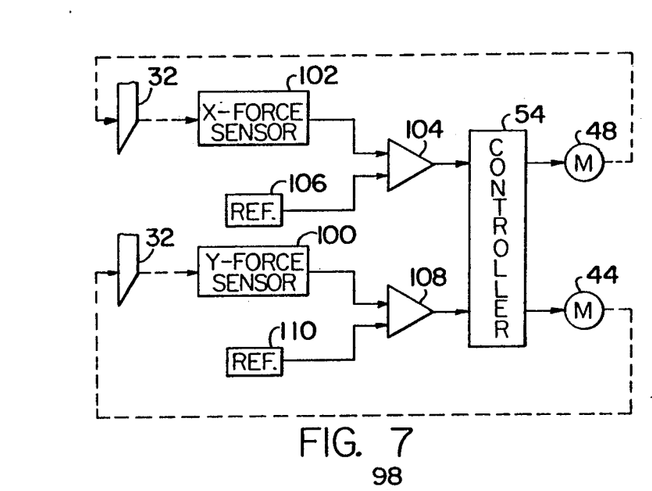
FIG. 7 is a schematic block diagram showing the circuit associated with the point follower of FIG. 6.

The force sensors 100 and 102 are respectively parts of an X axis closed loop control system and a Y axis closed loop control system as shown in FIG. 7. That is, the output of the X axis sensor 102 is compared by a comparator 104 with a reference value supplied by a reference circuit 106 and the error signal is supplied through the computer 54 to the X axis motor 48 which drives the knife 32 along the X axis to reduce and null the error. Likewise, the output of the Y force sensor 100 is compared by a comparator 108 with a reference signal supplied by a reference circuit 110 and the error value is supplied through the controller 54 to the Y axis motor 44 which moves the knife 32 in the Y axis to reduce and null the error. When an advancement of the material 22 is to occur the cutting tool 32 is inserted into the material (if not already there) at a point of insertion which becomes the index point 90 referred to above. The motor 24 is then operated to advance the material. As the material starts to advance a force in the X direction is exerted by the material on the tool, and through the action of the point follower as described above the tool is moved by the X motor 48 in the X direction with the material. If during this advancement the material shifts laterally it will exert a force on the tool in the Y coordinate direction causing, through the action of the point follower, the tool to be moved with such shift by the Y motor 44. Of course, correction for shifting in the X axis could also be accomplished by operating the X motor 48 in the direction of advance and through the action of the point follower causing the motor 24 to operate the conveyor so the material follows the tool. The closed loop control system has been described as separate from the digital controller, preferably its functions are accomplished digitally by the controller 54.

In the point follower described above in connection FIGS. 6 and 7 the cutting tool 32 is used as part of the point follower mechanism. If desired, a point following device can be provided using a probe separate from the knife 32 for defining the index point and being part of a force sensing system for detecting forces imposed on it by the material. Such a probe is shown at 112 in FIGS. 8, 9 and 10. It comprises a slender elongated member having a lower end which can be fixed to the work material at an index point. This fixing may occur by providing the probe with a pointed lower end and having it penetrate into the material when being fixed to an index point. Preferably, however, the probe is designed so as not to penetrate the material. Such a non-penetrating probe is shown in FIG. 10 wherein the probe at its lower end includes a cup-shaped portion 113. The probe 112 is moveable vertically between the full line and broken line positions indicated in FIG. 10. In the elevated full line position the probe is out of contact with the material 22. In the lowered position the cup portion 113 engages and presses downwardly on the material 22 to firmly fix the probe 112 to the material and to prevent it from slipping relative to the material in either coordinate direction. The probe 112 cooperates with a force sensing member 114 similar to the presser foot 34 of FIG. 6 for sensing forces imposed on the probe, in the X and Y coordinate directions, by the material while the probe engages the material. As shown in FIG. 9 the probe 112 is circular in cross section and is slidably received in a conforming opening 116 in an inner member 118 connected with the outer member 34 by the same force sensors 100 and 102 as in FIG. 6. These force sensors are in turn part of the same circuit as illustrated in FIG. 7 and described above in connection with that figure except for the probe 112 taking the place of the knife 32. The operation of the system of FIGS. 8, 9 and 10 is therefore the same as described above for the system FIGS. 6 and 7 except that the probe 112 is fixed to the material 22 to define an index point 90 rather than the knife 32.

Figure 8:
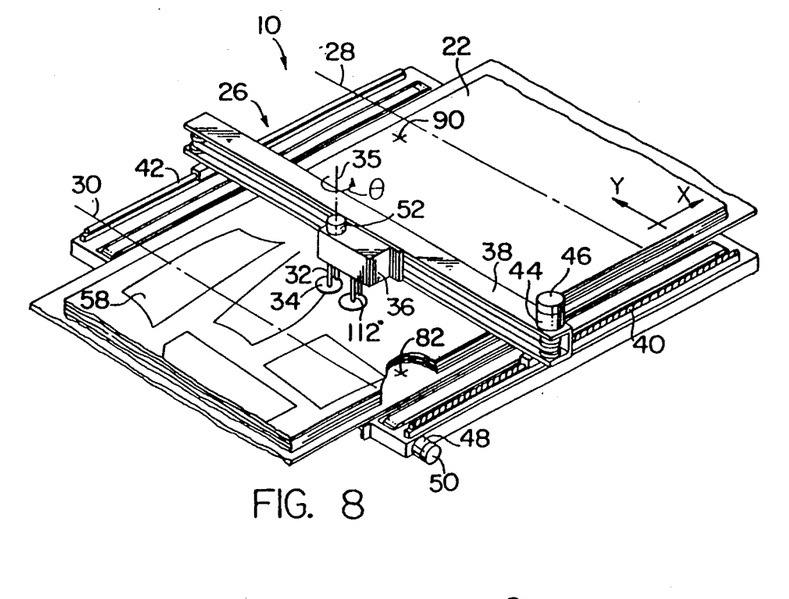
FIG. 8 is a fragmentary perspective view showing a machine comprising an alternative embodiment of the invention.
Figure 9:
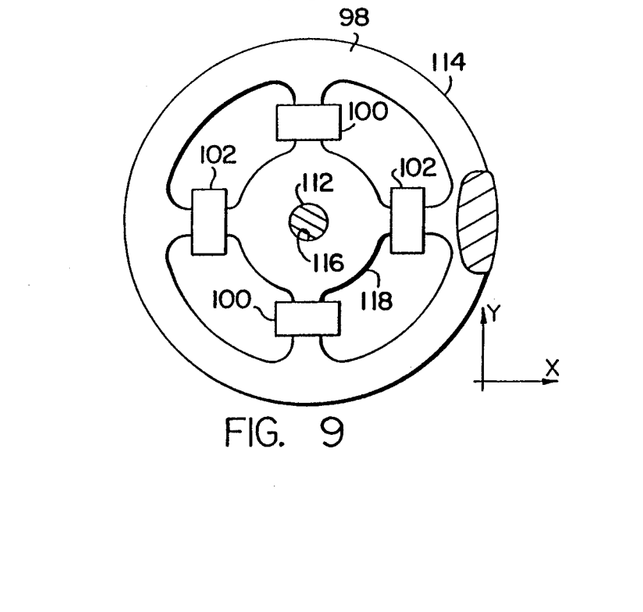
FIG. 9 is a plan view of a point following device used with the machine of FIG. 8.
Figure 10:
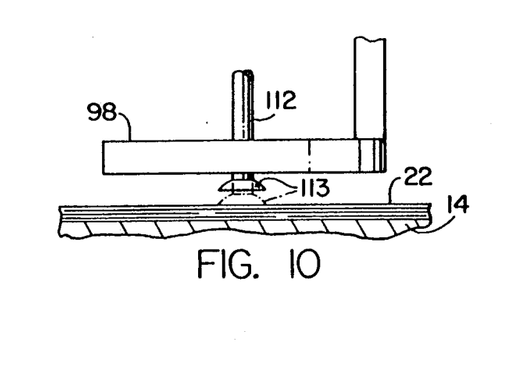
FIG. 10 is a side view of the point following device of FIG. 9.

The use of force sensors in the point following devices of FIGS. 6 and 7 and of FIGS. 8, 9 and 10 is not critical to the invention and if desired other types of sensors may be used. For example, instead of measuring the forces imposed on the cutting tool or a probe in the X and Y coordinate displacement sensors may be used for detecting deflection of the knife or probe away from a neutral position in both the X and Y axes, and in this case the actual sensing elements may for example be linear differential transformers.

Instead of using a physical means, such as the knife 32 of FIG. 6 or the probe 112 of FIG. 8, for fixing to an index point on the material, the cutter head 36 may be equipped with an optical sensor having an optical registration point brought into alignment with an index point physically marked or indicated on the top surface of the material 22. Such an optical sensor is shown at 120 in FIG. 11. This sensor views the surface of the material 22 located immediately below it and has an imaginary registration point 122 within its field of view fixed relative to the cutter head 36. The operation of the sensor 120 is further such that when an index point 90 marked on the top surface of the material 22 is brought into its field of view it will produce an X axis error signal representing the displacement of the registration point 122 from the index point 90 in the X coordinate direction and a Y axis error signal representing the displacement of the registration point 122 from the index point 90 in the Y coordinate direction. Therefore, the optical sensor 120 may be used as part of a point seeking and/or following system such as shown in FIG. 12.

Figure 12:
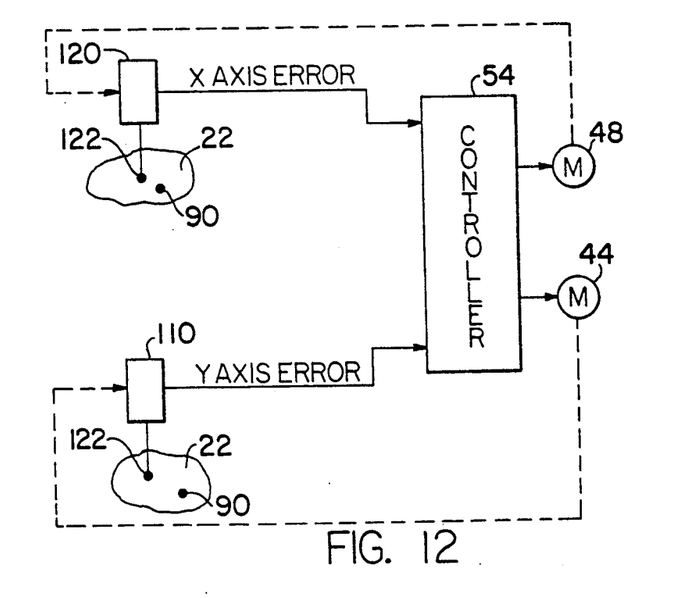
FIG. 12 is a schematic block diagram illustrating the circuit for the point follower used in the machine of FIG. 11.

With reference to FIG. 12, the optical sensor 120 produces an X axis error signal supplied to the controller 54. In response to this error signal the controller actuates the X axis motor 48 to drive the sensor 120 along the X axis in the direction to reduce and null the X axis error signal. Similarly, the sensor 120 produces a Y axis error signal supplied to the controller 54 and used by the controller 54 to actuate the Y axis motor 44 to drive the sensor 120 along the Y axis in the direction to reduce and null the Y axis error.

Figure 11:
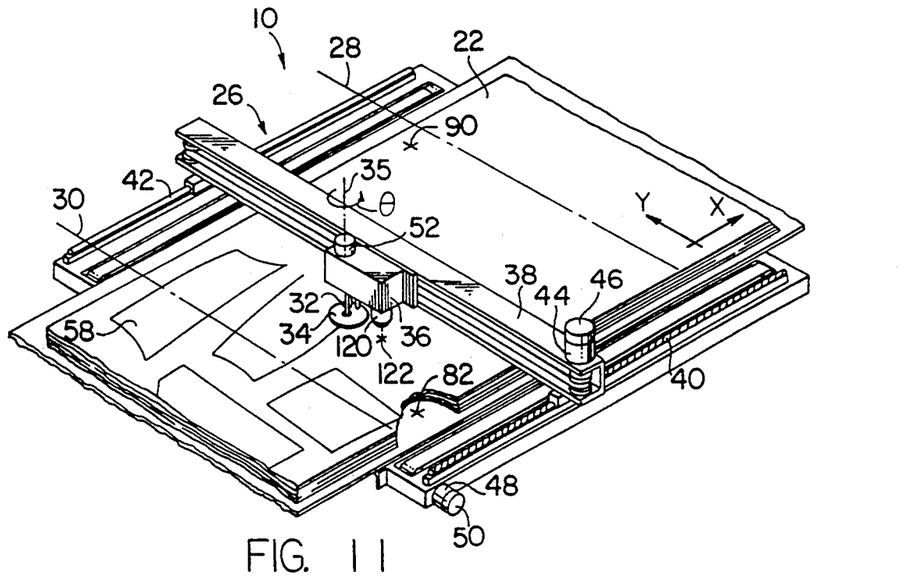
FIG. 11 is a fragmentary perspective view of a machine comprising a still further embodiment of the invention.

Use of the optical sensor of FIGS. 11 and 12 may be carried out in two different ways. In the first way, at the end of cutting a segment of material the cutter head 32 is moved to bring the field of view of the sensor 120 to an index point, such as the one indicated at 90 in FIG. 11, marked on the top surface of the material 22. The point seeking circuit of FIG. 12 is then put into operation which will cause the cutting head 36 to be moved to bring the registration point 122 of the optical sensor 120 into coincidence with the index point 90. The material 22 is then advanced to bring the next segment to the cutting station. During this advancement, the circuit of FIG. 12 is maintained in operation which will cause the cutter head 36 and its attached optical sensor 120 to follow the movement of the index point 90. At the beginning and end of the advancement the encoders therefore provide the desired index point coordinate information.

An alternative way of operating with the optical sensor of FIGS. 11 and 12 is to use the sensor 120 and the circuit of FIG. 12 only at the beginning and end of an advancement to hunt for and find the index point 90. That is, before starting an advancement of the material the sensor 120 is moved into the vicinity of the index point 90. The circuit of FIG. 12 is then brought into play causing the sensor 120 to be moved to bring its registration point 122 into coincidence with the index point 90. The encoders 46 and 50 are then interrogated to determine the starting coordinates of the index point 90. The circuit of FIG. 12 is then disabled and the material 22 advanced to bring a new segment to the cutting station. The cutting head is then moved by the controller 54 to bring the optical sensor 120 into the vicinity of the index point 90. The circuit of FIG. 9 is then turned back on causing the sensor 120 to again be moved to bring its reference point 122 into coincidence with the index point 90.

Instead of the sensor 120 of FIGS. 11 and 12 being an optical one it also could be a magnetic sensor with the index point being a point marked on the top surface of the material 22 with a magnetic media to which the sensor is sensitive.

In the above various different ways have been described for advancing both the work material and the cutter head during a material advancement in conjunction with an index point fixed relative to the top surface of the work material so that the starting and finish coordinates of the index point are provided by the X and Y encoders 50 and 46. As also previously mentioned this start and finish information concerning the coordinates of the index point may be used to provide correction factors used in conjunction with the cutting instructions to improve the cutting of the second section particularly with regard to the matching of lines which extend from one segment to another. The correction factors may be realigned and used in various different ways. For example, in a first way the displacement of the index point in each coordinate axis is determined from the start and finish encoder coordinate information and these X and Y displacements are then added or subtracted to the corresponding coordinate of each point in the cutting instructions as offset values and the so modified or offset coordinate values are then used to position the cutter head 36.

An alternative and preferred way of using index point coordinate information supplied by the encoder is when the cutter head registration point is aligned with the index point at the finish of an advancement to reset the encoders 50 and 46 with the coordinate index point values supplied by the encoders when the cutter head registration point was previously aligned with the index point at the start of the advancement. The effect of this is that, with reference to the encoders, the index point is given the same coordinates at the end of the advancement as it had at the beginning of the advancement. This automatically introduces into the encoders correction factors compensating for any mispositioning or shifting of the material relative to the machine axes during the advancement. The outputs of the encoders, as thus reset are then used, as described in connection with FIG. 3, during the cutting of the second segment.

We claim:

1. A method for cutting lines in work material consisting of a single sheet or a lay-up of sheets of sheet material, said method comprising the steps of:
   providing a cutting machine having a frame, a cutting station fixed relative to said frame, and a cutting tool at said cutting station,
   providing a length of work material such as aforesaid consisting of a number of adjacent lengthwise segments,
   providing a set of data defining in X and Y coordinates lines to be cut in a number of adjacent ones of said lengthwise segments of said work material,
   moving a first one of said material segments to said cutting station,
   using said set of data to provide a set of cutting instructions,
   using said set of cutting instructions to control movement of said cutting tool in X and Y coordinate directions relative to X and Y machine axes fixed relative to said frame to cut lines in said first segment,
   designating an index point on and fixed relative to said work material, said index point while said first segment of material is positioned at said cutting station having start coordinates in said X and Y machine axes,
   while said first segment of material is positioned at said cutting station acquiring the start coordinate in one of said X and Y machine axes of said index point,
   advancing said material relative to said machine frame to bring a second segment to said cutting station said index point when said second segment is positioned at said cutting station having finish coordinates in said X and Y machines axes,
   when said second segment is positioned at said cutting station acquiring the finish coordinate of said index point in said one machine axis, and
   then using said start and finish coordinates of said index point in said one machine axis in combination with said set of cutting instructions to control movement of said cutting tool in said X and Y coordinate directions to cut lines in said second segment.

2. A method for cutting lines in work material as defined in claim 1 and further including:
   said index point as a result of said step of advancing said material to bring a second segment to said cutting station undergoing a displacement in said one machine axis, and
   said step of using said start and finish coordinates in combination with said set of cutting instructions being carried out by using said start and finish coordinates to determine said displacement of said index point, adding or subtracting said displacement to or from said one axis coordinates of the points in said cutting instructions relating to lines to be cut in said second segment, and then using the cutting instructions as so modified to control said cutting tool to cut said second segment.

3. A method of cutting lines in work material as defined in claim 1 and further including:
   providing X and Y encoders producing signals representing the X and Y coordinates in said X and Y machine axes of a registration point fixed relative to said cutting tool,
   said step of using said cutting instructions to control movement of said cutting tool including using the outputs of said encoders to supply the instantaneous positions of said cutting tool for X and Y position feedback systems used to move said cutting tool to the points called for by said cutting instructions,
   said step of acquiring the start coordinate of said index point being performed by aligning said registration point with said index point while said first segment is positioned at said cutting station and interrogating said encoders,
   said step of acquiring the finish coordinate of said index point being carried out by aligning said registration point with said index point after said second segment is positioned at said cutting station, and
   said step of using said start and finish coordinates of said index point in combination with said set of cutting instructions being carried out by while said registration point is aligned with said index point after said material advancement resetting the encoder associated with said one machine axis to the value of said starting coordinate and then using the outputs of said encoders with said X and Y position feedback systems in the cutting of said second segment.

4. A method for cutting lines in work material consisting of a single sheet or a lay-up of sheets of sheet material, said method comprising the steps of:
   providing a cutting machine having a frame, a cutting station fixed relative to said frame, and a cutting tool at said cutting station,
   providing a length of work material such as aforesaid consisting of a number of adjacent lengthwise segments, providing a set of data defining in X and Y coordinates lines to be cut in a number of adjacent ones of said lengthwise segments of said work material, moving a first one of said material segments to said cutting station, using said set of data to provide a set of cutting instructions, using said set of cutting instructions to control movement of said cutting tool in X and Y coordinate directions relative to X and Y machine axes fixed relative to said frame to cut lines in said first segment, designating an index point on and fixed relative to said work material, said index point while said first segment of material is positioned at said cutting station having start coordinates in said X and Y machine axes, while said first segment of material is positioned at said cutting station acquiring in said X and Y machine axes said X and Y start coordinates of said index point, advancing said material relative to said machine frame to bring a second segment to said cutting station, said index point when said second segment is positioned at said cutting station having finish coordinates in said X and Y machines axes, when said second segment is positioned at said cutting station acquiring said X and Y finish coordinates of said index point, and using said start and finish X and Y coordinates of said index point in combination with said set of cutting instructions to control movement of said cutting tool in said X and Y coordinate directions to cut lines in said second segment.

5. A method for cutting lines in work material as defined in claim 4 and further including:

said index point as a result of said step of advancing said material to bring a second segment to said cutting station undergoing X and Y displacements in said X and Y machines axes, said step of using said start and finish X and Y coordinates of said index point in combination with said set of cutting instructions being carried out by using said start and finish coordinates to determine said X and Y displacements of said index point, adding or subtracting said X and Y displacements to or from said X and Y coordinates of the points in said cutting instructions relating to lines to be cut in said second segment, and then using the cutting instructions as so modified to control said cutting tool to cut said second segment.

6. A method of cutting lines in work material as defined in claim 4 and further including:

providing X and Y encoders producing signals representing the X and Y coordinates in said X and Y machine axes of a registration point fixed relative to said cutting tool, said step of using said cutting instructions to control movement of said cutting tool including using the outputs of said encoders to supply the instantaneous positions of said cutting tool for X and Y position feedback systems used to move said cutting tool to the points called for by said cutting instructions, said step of acquiring the start X and Y coordinates of said index point being performed by aligning said registration point with said index point while said first segment is positioned at said cutting station and interrogating said encoders, said step of acquiring the finish X and Y coordinates of said index point being carried out by aligning said registration point with said index point after said second segment is positioned at said cutting station, and said step of using said start and finish coordinates of said index point in combination with said set of cutting instructions being carried out by while said registration point is aligned with said index point after said material advancement resetting said X and Y encoders representing the values of said starting X and Y coordinates of said index point and then using the outputs of said encoders with said X and Y position feedback systems in the cutting of said second segment.

7. A method for cutting lines in work material as defined in claim 4 and further including:

said set of data being a set of marker data defining in X and Y coordinates the peripheral lines of pattern pieces to be cut in said work material at least one of which pattern pieces has a part falling into one of said segments and another part falling into an adjacent one of said segments.

8. The method for cutting lines in work material as defined in claim 4 further including:

said cutting tool being carried by a cutter head movable in said X and Y coordinate directions relative to said X and Y machine axes, said index point being defined on said work material by releasably fixing a member carried by said cutter head to said work material, during said step of advancing said material said member having forces imposed on it in said X and Y coordinate directions by said work material, during said step of advancing said material sensing said forces imposed on said member and producing X and Y force signals representing said forces, and using said X and Y force signals to drive said cutter head in such X and Y directions as to null said force signals thereby causing said member to follow said index point during the advancement of said material.

9. The method of cutting lines in work material as defined in claim 8 further including:

said member which is releasably fixed to said material to define said index point being said cutting tool.

10. The method of cutting lines in work material as defined in claim 8 further including:

said member which is releasably fixed to said work material to define said index point being a probe separate from said cutting tool and carried by said cutter head.

11. The method for cutting lines in work material as defined in claim 4 further including:

said cutting tool being carried by a cutter head movable in said X and Y coordinate directions relative to said X and Y machine axes, said index point being defined on said work material by releasably fixing a member carried by said cutter head to said work material, during said step of advancing said material said member undergoing X and Y deflections in said X and Y coordinate directions due to any relative movements which may occur in said X and Y coordinate directions between said work material and said cutter head, during said step of advancing said material sensing said X and Y deflections of said member and producing X and Y displacement signals representing said X and Y deflections, and using said X and Y displacement signals to drive said cutter head in such X and Y directions as to null said displacement signals thereby causing said member to follow said index point during the advancement of said material.

12. The method of cutting lines in work material as defined in claim 11 further including:

said member which is releasably fixed to said material to define said index point being said cutting tool.

13. The method of cutting lines in work material as defined in claim 11 further including:

said member which is releasably fixed to said work material to define said index point being a probe separate from said cutting tool and carried by said cutter head.

14. The method of cutting lines in work material as defined in claim 11 further including:

using linear differential transformers to sense said deflection of said member relative to said cutter head in said X and Y coordinate directions.

15. A method of cutting lines in work material as defined in claim 4 and further including:

said cutting tool being carried by a cutter head movable in said X and Y coordinate directions relative to said X and Y machine axes fixed relative to said frame, said step of designating an index point on and fixed relative to said work material being carried out by visibly marking said index point on the top surface of said work material, providing an optical sensor carried by said cutting head and having a reference point on said top surface of said work material fixed relative to said cutter head, providing an X axis encoder producing an X axis output signal representing the X coordinate position of said sensor relative to said X machine axis and a Y axis encoder having an output signal representing the Y coordinate position of said sensor relative to said Y machine axis, and said step acquiring the X and Y coordinates of said index point while said first segment of material is positioned at said cutting station including bringing said optical sensor reference point into coincidence with said index point and then interrogating said X and Y encoders to acquire said X and Y start coordinates of said index point, and said step of acquiring the X and Y finish coordinates of said index point being carried out by after said advancement moving said cutter head to bring said optical sensor reference point into coincidence with said index point and then interrogating said X and Y encoders to acquire said finish X and Y coordinates of said index point.

16. A method for cutting lines in work material as defined in claim 15 and further including:

during said step of advancing said material obtaining signals from said optical sensor representing the X and Y displacements of said sensor reference point from said index point and using said signals to drive said cutter head in said X and Y coordinate directions to cause said sensor reference point to follow said index point as said material is advanced.

17. A method for cutting lines in work material as defined in claim 15 and further including:

during said steps of moving said cutter head to bring said optical sensor reference point into coincidence with said index mark obtaining signals from said optical sensor representing X and Y displacements of said sensor reference point from said index point and using said signals to drive said cutter head in said X and Y coordinate directions to bring said reference point into coincidence with said index point.

18. A method for cutting lines in work material as defined in claim 4 and further including:

said step of advancing said material relative to said machine frame to bring a second segment to said cutting station being carried out by providing a point follower fixed relative to said cutting tool, aligning said point follower with a point fixed relative to said sheet material, moving said point follower in one of said X and Y coordinate directions, and through said point follower slaving the movement of said sheet material in said one coordinate direction to said point follower so that said sheet material moves with said point follower to bring said second segment to said cutting station.

19. A method for cutting lines in work material as defined in claim 18 and further including:

said point fixed relative to said sheet material with which said point follower is aligned being said index point.

20. A method of cutting lines in work material as defined in claim 19 and further including:

providing X and Y encoders producing signals representing the X and Y coordinates in said X and Y machine axes of a point fixed relative to said cutting tool, said step of acquiring the X and Y start coordinates of said index point being performed by interrogating said X and Y encoders after said point follower is aligned with said index point and before said advancement begins, and said step of acquiring said X and Y finish coordinates of said index point being performed by interrogating said X and Y encoders at the end of said advancement before said point follower is moved out of alignment with said index point.

21. A method for cutting lines in work material as defined in claim 4 and further including:

providing a point follower fixed relative to said cutting tool, said step of advancing said material relative to said machine frame to bring a second segment to said cutting station being performed by aligning said point follower with a point fixed relative to said sheet material, advancing said material in one of said X and Y coordinate directions to bring said second segment to said cutting station, and through said point follower slaving the movement of said point follower in said one coordinate direction to said advancement of said sheet material so that said point follower moves with said sheet material, providing X and Y encoders producing signals representing the X and Y coordinates in said X and Y machine axes of a point fixed relative to said cutting tool, said step of acquiring the X and Y start coordinates of said index points being performed by interrogating said X and Y encoders after said point follower is aligned with said index point and before said advancement begins, and said step of acquiring said X and Y finish coordinates of said index point performed by interrogating said X and Y encoders at the end of said advancement before said point follower is moved out of alignment with said index point.

22. A method of cutting sheet material as defined in claim 21 and further including:

said point fixed relative to said sheet material with which said point follower is aligned being said index point.

23. An apparatus for cutting lines in work material consisting of a single sheet or a lay-up of sheets of sheet material, said comprising:

a cutting machine having a frame, a cutting station fixed relative to said frame, and a cutting tool at said cutting station movable in X and Y coordinate directions relative to X and Y machine axes fixed relative to said frame, means providing a set of marker data defining in X and Y coordinates lines to be cut in a number of adjacent ones of lengthwise segments of work material which work material is longer than said cutting station, means for moving a first one of said material segments to said cutting station, means converting said set of data into a first set of cutting instructions, means using said first set of cutting instructions to control movement of said cutting tool in X and Y coordinate directions relative to said X and Y machine axes to cut lines in said first segment, means for advancing said material relative to said machine to bring a second segment to said cutting station, means for designating an index point on said work material, said index point before said advancement when said first segment is at said cutting station having start X and Y coordinates in said X and Y machine axes, and said index point after said advancement when said second segment is at said cutting station having finish X and Y coordinates in said X and Y machine axes, means for acquiring said X and Y start and finish coordinates of said index point, and means using said start and finish X and Y coordinates of said index point and said set of cutting instructions to control movement of said cutting tool to cut lines in said second segment of said work material.

24. An apparatus as defined in claim 23 further characterized by:

said means for designating an index point on said work material being said cutting tool which is plunged into said work material to designate the index point, means for sensing forces imposed by said material on said cutting tool in said X and Y coordinate directions as said material is advanced by said advancing means and for producing output signals related to said forces, and means responsive to said output signals for driving said cutting tool relative to said frame to cause it to follow said index point as the work material is advanced relative to said cutting station to bring a fresh segment of the work material to the cutting station.

25. An apparatus as defined in claim 23 further characterized by:

said means for designating an index point on said work material being a member which is fixed relative to said cutting tool and which is releasably fixed to said work material to designate the index point, and means for sensing forces imposed by said material on said member in said X and Y coordinate directions as said material is advanced by said advancing means and for producing output signals related to said forces, and means responsive to said output signals for driving said member relative to said frame to cause it to follow said index point as the work material is advanced relative to said cutting station to bring a fresh segment of the work material to the cutting station.

26. An apparatus as defined in claim 23 further characterized by:

said means for designating an index point on said work material being a member fixed relative to said cutting tool and which is releasably fixed to said work material to designate the index point, means for sensing deflection of said member relative to said cutting tool in said X and Y coordinate directions as said material is advanced by said advancing means and for producing output signals related to said deflections, and means responsive to said output signals for driving said cutting tool relative to said frame to cause it to follow said index point as the work material is advanced relative to said cutting station to bring a fresh segment of the work material to the cutting station.

27. An apparatus as defined in claim 26 further characterized by said means for sensing the deflection of said member relative to said cutting tool being linear differential transformers.

28. An apparatus as defined in claim 23 further characterized by:

said cutting tool being part of a cutter head movable in X and Y coordinate directions relative to said cutting station, means on said cutter head providing a registration point fixed relative to said cutter head, and said means for acquiring relative to said X and Y machine axes the X and Y start and finish coordinate of said index point being an X encoder providing an output signal representing the X coordinate of said reference point relative to said X machine axis and a Y encoder providing an output signal representing the Y coordinate position of said reference point relative to said Y machine coordinate axis, whereby when said registration point is coincident with said index point said encoders may be interrogated to provide indications representing the X and Y coordinates in said machine coordinate axes of said index point.

29. An apparatus as defined in claim 28 further characterized by:

said X and Y encoders being parts of X and Y position feedback systems for positioning said cutter head in said X and Y coordinate axes and being settable to initial values.

30. An apparatus as defined in claim 23, further characterized by:

said cutting tool being part of a cutter head movable in said X and Y coordinate directions relative to said cutting station, said means for acquiring said X and Y start and finish coordinates of said index point including an optical sensor having a registration point fixed thereto and viewing a portion of the top surface of said material, which optical sensor is operable to provide X and Y error signals representing respectively displacements of said registration point from said index point in said X and Y machine axes, and means responsive to said error signals for causing said cutter head to be moved to bring said registration point into coincidence with said index point.

31. An apparatus for cutting lines in work material consisting of a single sheet or a lay-up of sheets of sheet material, said apparatus comprising:

a frame, means providing a cutting station fixed relative to said frame and including a cutting tool movable in X and Y coordinate directions relative to X and Y machine axes fixed relative to said frame, X and Y encoders providing output signals representing the X and Y coordinates of said cutting tool relative to said X and Y machine axes, means providing cutting instructions corresponding to lines to be cut in work material such as aforesaid, means including X and Y position feedback systems response to said encoder output signals and to said cutting instructions for moving said tool in said X and Y coordinate directions relative to said X and Y machine axes to cut said lines in said work material, means for moving work material such as aforesaid segment-by-segment to said cutting station, means providing a registration point fixed in said X and Y machine axes relative to said cutting tool and which may be aligned with an index point on said work material before the start of a given advancement of said work material relative to said cutting station to permit the X and Y coordinates of said index point as positioned before said start of said given advancement of said work material to be derived from said X and Y encoders, and means operable after said given advancement of said work material and while said registration point is again aligned with said index point for resetting said X and Y encoders to said X and Y coordinates of said index point as positioned before the start of said given advancement of said work material.

* * * * *